United States Patent [19]

Henricson

[11] Patent Number: 4,904,395

[45] Date of Patent: Feb. 27, 1990

[54] METHOD AND APPARATUS FOR THICKENING FIBER SUSPENSION

[75] Inventor: Kaj O. Henricson, Kotka, Finland

[73] Assignee: A. Ahlstrom Corporation, Noormarkku, Finland

[21] Appl. No.: 130,403

[22] Filed: Dec. 9, 1987

[30] Foreign Application Priority Data

Dec. 17, 1986 [FI] Finland ................................ 865136

[51] Int. Cl.$^4$ .............................................. C02F 1/00
[52] U.S. Cl. ...................... 210/741; 210/767; 210/808
[58] Field of Search .............. 210/739, 741, 767, 791, 210/808, 650, 651

[56] References Cited

U.S. PATENT DOCUMENTS

| | | | |
|---|---|---|---|
| 3,939,075 | 2/1976 | Ginaven | 210/258 |
| 4,041,560 | 8/1977 | Jacobsen | 8/156 |
| 4,096,060 | 6/1978 | Lee et al. | 210/650 |
| 4,136,035 | 1/1979 | Bogomolov et al. | 210/808 |
| 4,157,302 | 6/1979 | Bergstedt | 210/791 |
| 4,396,509 | 8/1983 | Foyn | 210/315 |

FOREIGN PATENT DOCUMENTS

| | | | |
|---|---|---|---|
| 0122439 | 10/1984 | European Pat. Off. | 210/767 |
| 1658/62 | 11/1869 | Finland . | |
| 59828 | 4/1941 | U.S.S.R. . | |
| 516210 | 4/1977 | U.S.S.R. . | |
| 962444 | 7/1964 | United Kingdom . | |
| 2009274 | 6/1979 | United Kingdom . | |

OTHER PUBLICATIONS

"Medium Consistency Technology", Gullichen & Härkönen, Journal of the Tech. Assoc. of the Pulp and Paper Industry, vol. 64 (1981) Jun. No. 6, pp. 69-72.

Primary Examiner—Richard V. Fisher
Assistant Examiner—Cynthia L. Nessler
Attorney, Agent, or Firm—Toren, McGeady & Associates

[57] ABSTRACT

The present invention relates to a method and an apparatus for thickening of fiber suspension. In particular, the invention relates to removal of water from pulp which is caused to thicken in a closed space equipped with a fine-perforated or fine-slotted screen surface. The problem with the prior art devices has been their complex structure or, in simpler solutions, their great susceptibility to clogging. These problems have been found out to be overcome through dimensioning of perforations in the screen surfaces (28, 30; 38, 40) of the thickener and the flow channels (33; 37) between the filtering surfaces (28, 30; 38, 40) in such a way that the pulp flows in the channels as a plug flow, that is, the internal friction of the pulp is greater than the surface friction between the pulp and the screen surface.

9 Claims, 5 Drawing Sheets

METHOD AND APPARATUS FOR THICKENING FIBER SUSPENSION

BACKGROUND OF THE INVENTION

The present invention relates to a method and an apparatus for thickening fiber suspension. In particular, this invention is directed to draining water out of pulp which is made to thicken in a closed space equipped with a fine-perforated or a fineslotted screen surface. This is realized by maintaining a pressure difference necessary for thickening over the screen surfaces.

Fiber material, in particular cellulose and wood fiber pulp, is usually treated in the form of a dilute suspension. For instance, screening with perforated or slotted screens is carried out at a consistency of 1% to 3%. After screening, the fiber suspension must, due to various reasons, be thickened to a higher consistency. Often the consistency is raised to a range of 10% to 15%, e.g. for storage or refining of reject.

The pulp and paper industry knows various suction filters which have been given much attention in the literature of the field. Thickening with suction filters is achieved by sucking water out of the pulp through a filter fabric. There are also a number of other ideas or apparatuses being developed, which can be used to extract large quantities of fluid from the pulp suspension. What all these have in common is the fact that they are complex in structure and include moving parts: An example of such an apparatus is described in U.S. Pat. No. 3,455,821, which utilizes vibrations to clean the screen surface.

U.S. Pat. No. 3,870,638 describes cleaning of screen surface by means of back-blowing and pressure pulses only. The problem is, however, that it is difficult to time the back-blowing and pressure pulses accurately enough to clean the screen and make the concentrated pulp flow on and the dilute pulp fill the thickening zone of the screen area in one swift motion. This apparatus also has the characteristic feature that the concentrated pulp stays immobile in respect to the screen surface during the thickening stage.

The above-mentioned apparatuses usually give a consistency of 10% to 15%. However, a higher consistency than that is often required. According to trade literature, roll presses or pressure screws are generally used to reach higher consistencies.

For roll presses, the pulp is spread out as web and led through two perforated rolls. The rolls form a press nip, which squeezes water out of the pulp. After the pressing process, the pulp drops on a receiver screw which takes it to the next treatment stage. A disadvantage in such an apparatus is its complex construction and the mixing of air with the pulp during after-press stages.

In the pressure screw, water is removed from the pulp by forcing the pulp into a converging space, which is equipped with a screen surface. This forces the water to be drained through the screen surface, which raises the consistency. The problem with this kind of an apparatus is its complex structure and the high risk of clogging of the screen surface perforations.

So-called tube filters are known to be a simpler form of thickening/filtering structures. An example of these is a method and an apparatus presented in U.S. Pat. No. 3,794,179 for thickening of fluid containing solid matter. The operation of the apparatus relies on thickening of solid material on a screen surface at the initial stage. At the next stage, the concentrated matter is washed with a strong flow. Continuous flushing is an alternative cleaning method. Whichever method is used, there remains the problem that the concentrated matter is diluted through the use of washing liquid. Thus, the apparatus is more applicable to production of filtrate lacking solid matter than to thickening of pulp suspension.

Another example of a tubular filter is an apparatus according to U.S. Pat. No. 3,674,154, where the problem is clogging of the screen surface. This can be avoided at least partly by taking advantage of the widening of the cross sectional area of flow, which according to the same disclosure, keeps particles in the middle of the flow due to their slowness and enables the lighter fluid to move to the walls and out through the holes in the screen surface. Such an apparatus is useful when separating relatively large particles out of a fast-flowing dilute fluid. However, the apparatus is not suitable to thickening of pulp suspension, because the fibers are not loose in the suspension but form a three-dimensional fiber network, which has the tendency of expanding due to the bending force of fibers. Therefore, the fibers do not remain in the middle of the flow. Another drawback for the use of an apparatus according to this US disclosure is the fact that the pulp flow proceeds as a plug flow, which due to its relatively stiff nature prevents the flow from behaving the way fluid matter usually does at the constriction and expansion points.

A third solution which resembles the previous ones is an apparatus according to US Patent Disclosure 4,421,646, which is a tubular filter including several layered screen plates or corresponding means disposed on top of each other. Between these surfaces there is material which performs the fine filtration. This solution is, as mentioned in the disclosure, meant for screening of water or corresponding substance and not for thickening of suspension. Furthermore, the apparatus would not be applicable to thickening of fiber suspension, since the slots in the screen plates would actually collect fibers and on the other hand the fine filtering material between the plates would immediately be clogged by the fine material that the pulp suspension contains.

A fourth example of thickening apparatuses is a tubular thickener according to U.S. Pat. No. 2,998,064, which is designed for removing liquid from chips-liquid suspension. The walls of the thickener consist of ribs parallel to the flow between which ribs there are slots so small that wooden chips can not penetrate through them. In addition, the diameter of the tube inlet corresponds to the inner diameter of the thickener and the diameter of the tube outlet corresponds to the outer diameter of the thickener, so even the chips that partly have found their way into the slots are partly carried away by the flow and they do not clog the thickener from the discharge end backwards. Structurally, however, this kind of a thickener is difficult to realize, since the wall of the thickener consists of loose bars whose firm connection to each other to provide equal slots demands great accuracy and care.

SUMMARY OF THE INVENTION

The purpose of the present invention is to provide a method and an apparatus for the removal of water from fiber suspension using a static thickener which does not involve moving parts and is free of the disadvantages of the solutions described above.

The characteristic feature of the method according to the present invention is that the fiber suspension is led to a channel equipped, at least partly, with filtering surfaces, where it flows as a plug flow of multidimensional fiber network in which the internal friction of the fiber suspension is greater than the surface friction between the pulp and the filtering surface.

The characteristic feature of the apparatus according to the invention is that the thickener element consists of one or more flow channels that are limited by filtering surfaces, or by filtering surfaces and their opposite surfaces. The size of the pores, perforations or slots in the filtering surfaces of the flow channels and the dimensions of the said channels are chosen so as to maintain the surface friction of the pulp to be thickened smaller than the internal friction.

Further relevant features of the invention are described in the subclaims.

A more detailed description of the method and the apparatus according to the invention is given below with reference to accompanying drawings, in which FIG. 1 presents, how the consistency of fiber suspension influences the surface friction and the internal friction of pulp, FIG. 2A presents in a larger scale, how the size of the screen surface perforations influences the behavior of fibers in the neighborhood of a perforation, FIG. 2B is a view similar to that of FIG. 2A only with larger perforations.

FIG. 3 presents one preferred embodiment of an apparatus for carrying out the method according to the invention, FIG. 4 presents another preferred embodiment of an apparatus for carrying out the method according to the invention, FIG. 5 presents a third preferred embodiment of an apparatus for carrying out the method according to the invention, FIG. 6 presents a fourth preferred embodiment of an apparatus for carrying out the method according to the invention, FIG. 7 presents, as an example, the application of the method and the apparatus according to the invention to a bleaching process of pulp, and FIG. 8 presents, as an example, the application of the method and the apparatus according to the invention to refining of reject.

FIGS. 9a and b present in graphic illustration the operation of an apparatus according to the invention.

DESCRIPTION OF THE PREFERRED EMBODIMENTS:

Figure 1:
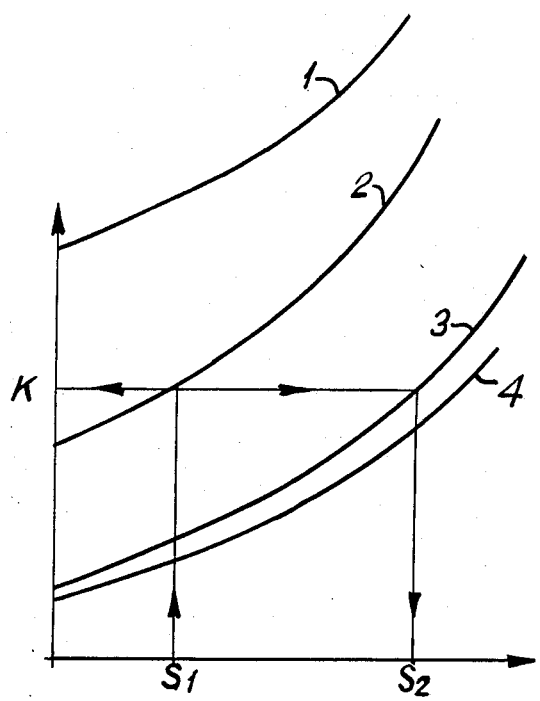

The coordinates of FIG. 1 are a horizontal one depicting the consistency of pulp and a vertical one for friction. Curve 1 depicts the correlation between friction and pulp consistency in tube flow, when there are fairly large holes (diameter over 1 mm) in the tube wall. Curve 2 depicts the internal friction of pulp, in other words, how strong shear forces the pulp can transfer, that is, how tightly the fibers are bound to each other. Curve 3 corresponds to curve 1 with the exception of smaller perforations (diameter about 0.2 mm). Curve 4 depicts the surface friction of tube flow, that is, how strong shear forces are generated on a solid tube wall as the pulp flows slowly in the tube. Since surface friction 4 is smaller than internal friction 2, the pulp advances as a plug flow in the tube. This is a generally known fact and applies to low flow rates. For instance, pulp of the consistency of 10% is extremely stiff and the flow takes place as pure plug flow at normal flow rates, which are of the order of 1 to 2 m/s. The flow rate must be raised to the range of 30 to 40 m/s before the overall turbulence becomes intensive enough to completely break down the fiber network-only then does the flow stop being a plug flow. In other words, the pulp flow forms a stiff plug which carries also surface fibers as long as the flow rate is sufficiently low and the fibers do not attach to the wall.

It is possible to thicken pulp suspension as it flows in the tube by making perforations, slots or pores in the tube wall.

Figure 2A:
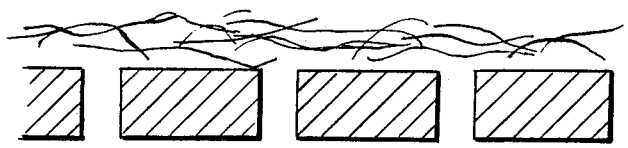
Figure 2B:
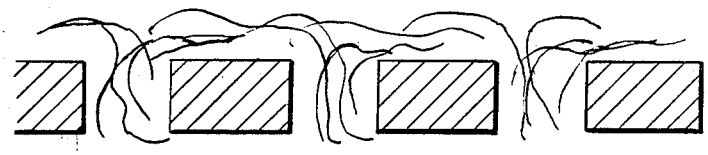

FIG. 2 shows how fibers behave near different-sized perforations. FIG. 2A depicts a situation where the perforations are sufficiently small, diameter about 0.2 mm, in which case the fibers do not penetrate into the perforation but stay on the surface of the screen. The fibers do not stick to the screen surface even though some filtrate is discharged through the perforations. As shown in FIG. 1, surface friction 3 is slightly larger than friction 4 acting on a smooth surface.

If too large perforations are used (diameter about 1 mm, FIG. 2B), the fibers go partly into the holes, the surface friction rises and may easily exceed the internal friction 2 of the pulp. In such a case, the bondings between the fibers are loosened and the fibers no longer form a stiff network with the result that more and more fibers penetrate into the perforations of the screen surface thus causing rapid clogging of the screen surface.

Therefore, it is important that the surface friction in the thickening apparatus is kept smaller than the internal friction of the fiber suspension. In other words, the flow is kept as a plug flow where the fibers in the pulp suspension are tightly bonded to each other and are thus carried with the pulp without clogging the perforations of the screen surface.

According to the method described in the invention, the consistency of the supplied pulp can be chosen as $s_1$. As shown in FIG. 1, the internal friction on Curve 2 is K. If the apparatus has a screen surface with small perforations, the consistency may rise to a value of $s_2$, near the surface without the surface friction 3 exceeding the internal friction 2. On the other hand, if the feed consistency and the desired consistency together with the effect of flow rate are known, the maximum size of the screen perforations can be determined.

Thus the invention makes it possible to remove filtrate from the surface of plug flow with no hindrance to the plug flow. This can be done in a controlled way and the average consistency thus be raised without the screen surface being clogged, even though the consistency in the surface layer is higher than anywhere else in the flow. This is possible through the use of pulp, in which the fibers form a three-dimensional fiber network which is extremely stiff, even though there is easily flowing fluid between the fibers which is removed.

When the necessary increase in the consistency is larger than the size of the screen surface perforations allows, the increase must be carried out in stages: in the first stage from consistency $s_1$ to surface consistency $s_2$, the average consistency being $s_3$; in the second stage from average consistency $s_3$ to surface consistency $s_4$, and so on. We can take as an example a test run in which the consistency of a certain pulp type could be raised from 11.4% to 14.25% in one stage.

Figure 3:
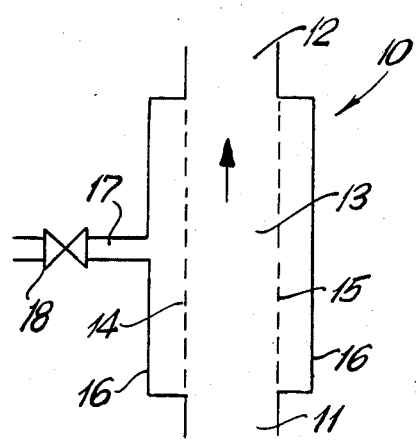

FIG. 3 presents one preferred embodiment of an apparatus for carrying out the method according to the invention where the apparatus (10) consists of an inlet (11), an outlet (12), a channel (13) connecting these two, filtering surfaces (14 and 15) of the channel, an outside wall (16) and a filtrate discharge channel (17) which includes a control valve (18). The apparatus according to the invention operates in the following way: First, the apparatus is connected to flow pipes of pulp or a corresponding element, so that the pulp advances as a plug flow through the thickener (10). At the screen surfaces 14 and 15 (which can also be one uniform cylindrical surface) of the thickener 10, there exists a pressure difference over the screen surface which results in the fluid being filtered through the screen surface. The necessary pressure difference is generated either by the hydraulic pressure brought about by the pulp itself, by pressure brought about by a pump, by suction generated separately, or by any combination of these. The screen surface 14, 15 consists of an even or curved plate with perforations, slots or pores whose diameter or width is smaller than 0.3 mm, preferably 0.2 mm, which enables the use of sufficient flow rated and gives a good filtering result.

A further development of an apparatus shown in FIG. 3 is a thickener including a centrally located distributing element (not shown) between the screen surfaces in the channel. This distributing element confines channels, which are narrower than the inlet channel, between itself and the filtering surfaces. In the tests that have been referred to previously, the thickener solution was exactly as described above; the filtering surface consisted of a screen plate cylinder, the diameter of which was 381 mm, and the centrally located distributing element was a closed cylinder with a diameter of 256 mm. Hence, there remained a 62.5 mm wide annular flow channel between the screen surface and the closed cylinder. In the test, the length of the filtering surface was about 330 mm, surface area 0.4 m² of which open surface took 10%, and the screen surface perforations had a diameter of 0.2 mm. The consistency of the pulp supplied to the thickener was 11.4% and that of the thickened pulp 14.25%. The volume flow was 500 l/min, the feed pressure 4.9 bar, and the pressure difference over the filter 4.2 bar with a feed of 100 l/min filtrate.

Figure 4:
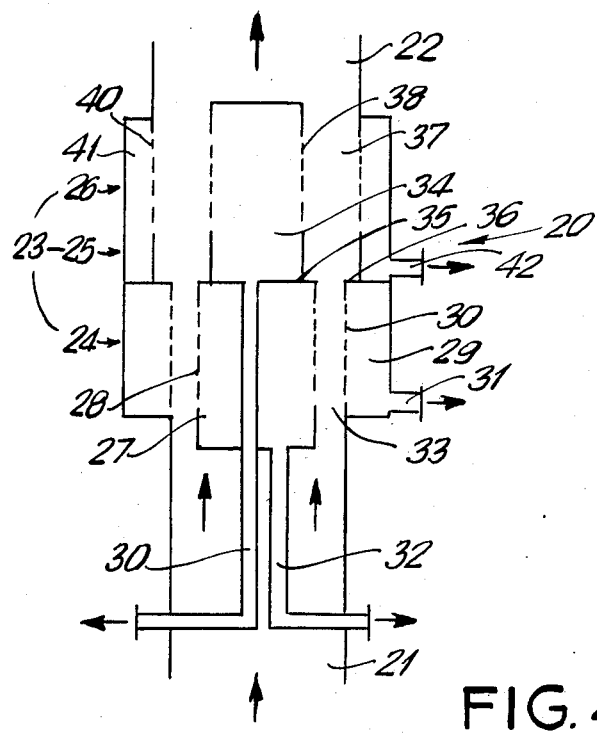

Another preferred embodiment of the invention presented in FIG. 4 is the result of further development of an apparatus depicted in FIG. 3 and used in the test mentioned above. The apparatus illustrated in the figure has a substantially cylindrical structure, even though various solutions based on a cone plus a cylinder or two cones are possible. As the figure shows, the apparatus (20) consists of a cylindrical inlet channel (21), a discharge channel (22) of the same shape, and a thickener element (23) between them. The thickener element 23 is divided into three zones: a first thickener zone (24), a homogenizing zone (25) and a second thickener zone (26). The first thickener zone consists of a cylindrical distributing element (27), its jacket (28) which is equipped with a filtering surface, an opposite filtrate chamber (29) to which the liquid is drained through a filtering surface (30), and filtrate discharge channels (31 and 32), of which the latter leads the liquid away from the filtrate chamber formed by the distributing element 27. A first flow channel (33) remains between the filtering surface 28 of the distributing element 27 and the opposite screen or filtering surface 30.

In the embodiment illustrated in FIG. 4, the homogenizing zone 25 is formed by shoulder 35 between the distributing element 27 and its extension 34, and also an end shoulder 36 of the filtering surface 30 expanding the cross-sectional flow area in a channel 37 which is an extension of the channel 33. The purpose of the homogenizing zone is to mix the fiber suspension so that its consistency is homogenized. In the embodiment shown in the figure, the sharp-angled shoulders cause reorientation of the fiber network and thus homogenization of the consistency. The reason for mixing is that the inner and the outer frame consistency of the "pulp ring" coming from the first thickening zone is considerably higher than the consistency of the middle part of the ring. Therefore it is advantageous in view of the thickening to mix the pulp suspension as well as possible before the second thickening zone. The reason for expanding the flow channel is the fact that as the pulp consistency increases, the bonding forces between the suspension fibers increase as well. In other words, when the pulp is dilute the distance between the filtering surfaces must be small in order to prevent the pulp from attaching to the screen surface, and to cause the suspension to continue to flow as a plug flow. After the first precipitation stage, the consistency has risen enough to allow increasing of the cross-sectional flow area due to the increased internal friction. The pulp consistency can also be homogenized by letting the pulp stay long enough without removing the filtrate; so the use of the shoulder is mainly aimed at making the inevitable homogenizing process even more efficient.

After homogenizing zone 25, there is another thickening zone 26, which is constructed around the annular flow channel 37. The inside surface of the channel 37 consists of a filtering surface 38, which forms the jacket of the extension 34 of the distributing element 27. The filtrate is removed, either through a channel shared with filtrate chamber 29 or via a separate channel 39. The outer frame of the flow channel 37 consists of a filtering surface 40, which excludes a filtrate chamber 41, from where the filtrate can be led out either via the filtrate chamber 29 or via a separate channel 42.

As noted earlier, the pressure difference acting over the filtering surfaces can be effected either with hydrostatic pressure, constriction of the discharge channel, or suction produced in the filtrate chamber.

Using the apparatus depicted in FIG. 4, it is possible to carry out the stage-by-stage thickening mentioned in connection with FIG. 1 using the same apparatus. Likewise, it is possible to provide even more thickening stages in the same apparatus than those presented in FIG. 4. It is also important always to provide a homogenizing zone between different thickening zones in order to homogenize the pulp consistency as much as possible. This need not necessarily be done with a sudden expansion of the cross-sectional flow area as shown in FIG. 4, but, for instance, with a moving mechanical element that could be, e.g., a rotor in the case of cylindrical apparatuses. This would also enable the use of two concentric cones as filtering surfaces, of which cones the outer one has a larger top angle which causes the flow channel to widen evenly towards the outlet. Likewise, it is possible to use a cone and a cylinder or two cones converging slightly in opposite directions. The basic principle is to let the flow route to widen from the inlet towards the outlet.

Figure 5:
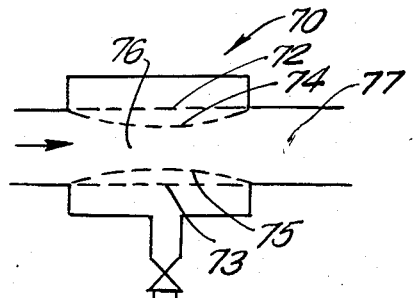

FIG. 5 shows an embodiment corresponding to the solution in FIG. 3 with the difference that the filtering surfaces 74 and 75 of thickener 70 are made of a flexible material. Preferably, the surfaces 74 and 75 form a constriction point 76, as in FIG. 5, from which position the surfaces 74 and 75 can, however, move due to the influence of the pulp pressure towards their support surfaces 72 and 73, which prevent the flow channel from expanding larger than outlet 77. A good solution is to use a perforated cylindrical rubber tube as a filtering element, which tube is stretched to the size of the inlet and outlet at the ends.

Figure 6:
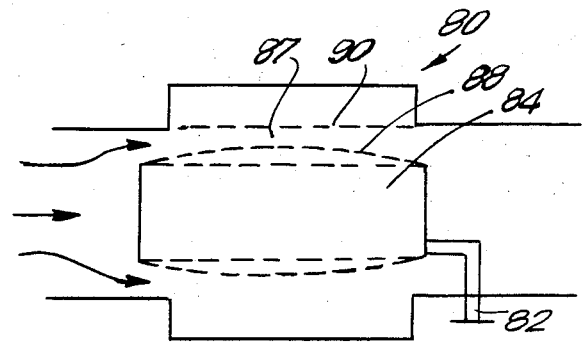

FIG. 6, on the other hand, presents a somewhat simpler embodiment which is principally equivalent to the structure depicted in FIG. 4. Here surface 88 of a distributing element 84 of a thickener 80 is arranged to be bulged and flexible by the use of, for instance, pressurized air so that its surface presses pulp against its opposite surface 90, which opposite surface can also be flexible like the surfaces 74 and 75 in FIG. 5. This allows even large pulp flocks to pass through flow route 87 without clogging it. This can be further ensured by making the distributing element convergent in the flow direction, which convergence is compensated by the bulging of the filtering surfaces. In addition, FIG. 6 presents surface 88 as perforated, which of course means that it can not have been bulged directly through the use of pressurized air, but, for instance, with one or more pressure medium devices such as an annular pressure element provided around the distributing element 84. If, on the other hand, the surface 88 is tight, pressurized air or corresponding agent can be led to the distributing element via connection 82.

Both embodiments presented above are only examples of how many variations can be effected with the apparatus and the method according to the invention. Further, it is possible that when the flow channels are rectangular, the compliance of the filtering surfaces consists of the entire wall falling against a pressure element (string, rubber bellows, etc.). In this case, the original position of the wall of course constricts the flow cross-sectional area, and the maximum deflection is determined by the cross-sectional area of the outlet of the thickener. The said pressure element also provides an adjustable compressive force. Furthermore, it is possible that a bag-like element with adjustable pressure can in some cases be used as a distributing element. This bag-like element would be non-perforated and its sole purpose would be to constrict the pulp flow against the filtering surfaces.

However, all solutions based on a flexible filtering surface have the characteristic feature of allowing the pass-thru of flocks without clogging the thickener or decreasing the thickening capacity of the thickener, because they give way only for the flock in question and resume their shape after it has passed.

The thickener need not necessarily be cylindrical; the inlet channel, the discharge channel and the thickener can be elliptical or rectangular, that is, of any regular geometric shape which allows the central location of a distributing element so that fiber suspension passes evenly by it. The apparatus can be further developed to include several separate distributing elements in the thickener, which elements, together with the outside surfaces of the thickener, determine several flow channels preferably having the same flow resistance. This makes it possible to arrange the filtering surfaces plane-like and, if necessary, somewhat wedge-shaped against the flow direction so that the flow channel widens in the flow direction. It is also not necessary that all the filtering surfaces presented in FIG. 4 be in use, but, instead, it is possible to use an apparatus where the distributing element, for instance, is completely closed. Naturally, part of the filtering surfaces may from time to time be unused or back-blowing can momentarily be used to clean the surfaces.

Figure 7:
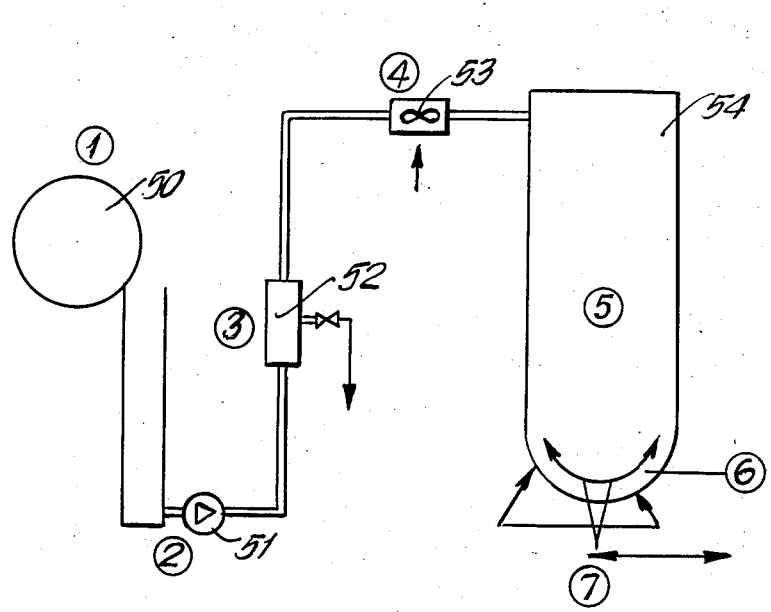

FIG. 7 depicts the application of the method and apparatus according to the invention to the bleaching process of pulp. The pulp is pumped from a thickener 50 at a consistency of 12% with a so-called MC pump 51 through a thickener 52 according to the invention, and to a chemical mixer 53, the consistency of the pulp being about 18% by the time it reaches the mixer, and the pulp as such is further taken to a bleaching tower 54.

Figure 8:
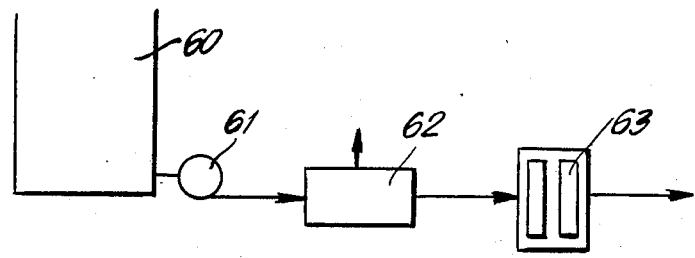

Another embodiment example is given in FIG. 8, which shows an application of the apparatus according to the invention for reject grinding. In this application, the pulp is pumped from a reject pulp container 60 with a pump 61 to a thickener 62, which is connected to a direct pipe line and from which the pulp, thickened from the consistency of 3% to the consistency of 8%, flows on to a grinder 63.

As the above described few embodiment examples reveal, the method and the apparatus according to the invention have numerous and differing applications. Because of its simple construction, small size and reliability of operation, the apparatus is suitable for many operation locations where ordinary drum thickeners, etc would be difficult to fit in.

The description includes a detailed description of only a couple of preferred embodiments, for which various alternative solutions are presented in a somewhat more general form. The cylindrical thickener used in the test, whose filtering surface had perforations of 0.2 mm diameter, can be replaced with, for instance, two parallel, flat screen surfaces which define the flow route in between or a square-shaped or corresponding tube. Likewise, the screen surface perforations can be replaced with long, in some cases endless, slots which run parallel with the flow and whose width is preferably 0.2 mm. This alternative further decreases the risk of the screen surface being clogged.

One advantageous form of a slot screen is a structure where the screen surface facing the pulp consists of long slots, whose width is sometimes even less than 0.2 mm. On the outer surface of the screen, holes with a diameter larger than a screen slot have been drilled, reaching in some cases the bottom of several slots simultaneously.

In case of the inner screen surface being clogged, it is possible to arrange a reverse flow flushing equipment in the apparatus, or the inside element of the apparatus can be arranged so that it can be moved in the flow direction, which opens at least the worst cloggings. Further, various scrapers or rotors can be installed in the thickener to open cloggings.

Figure 9A:
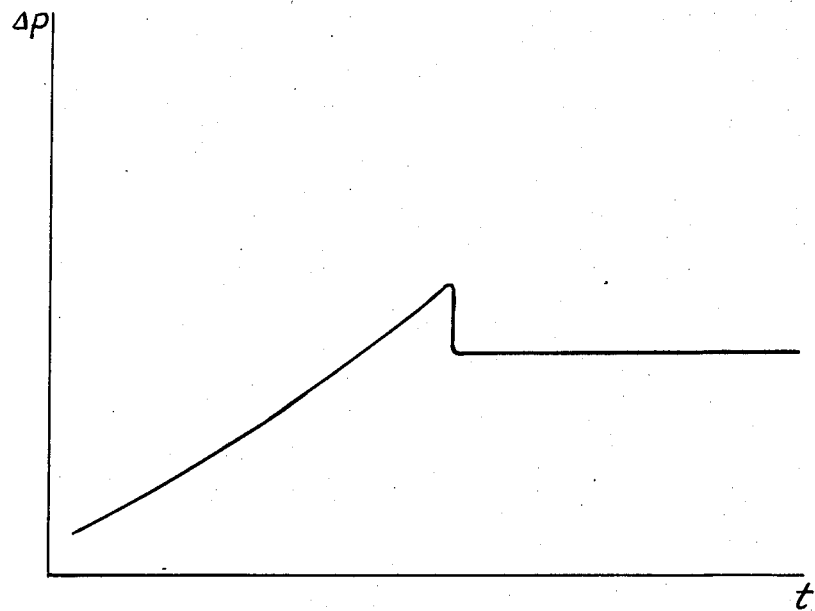
Figure 9B:
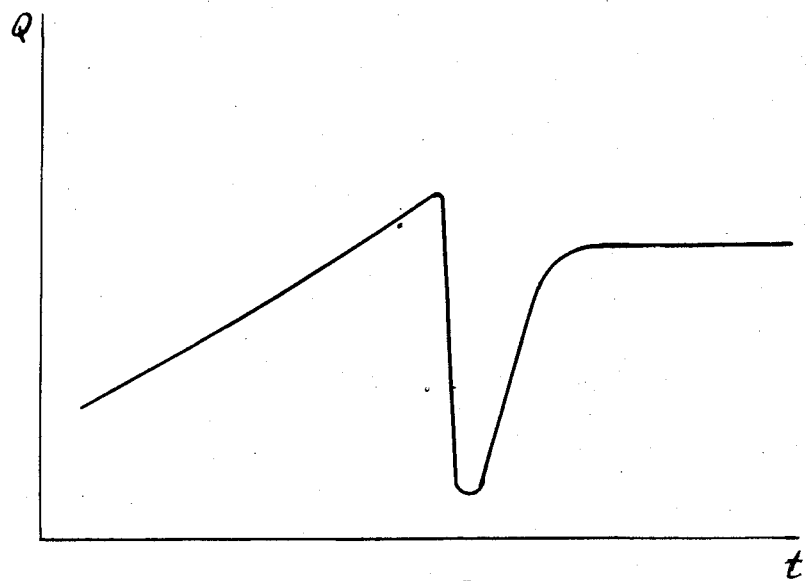

FIG. 9a illustrates the pressure difference over the screen surfaces as a function of time. FIG. 9b illustrates the change in the volume flow of the filtrate in the discharge channel as a function of time. At the initial stage, in other words when the apparatus is started, both the pressure difference over the screen surfaces and the volume flow of the filtrate steadily increase. Thus, in this stage the internal friction of the plug flow of the fiber suspension is greater than the surface friction between the fiber plug and the screen surface as the volume of filtrate steadily increases with the increase in the pressure difference. At a certain pressure difference, however, the volume of filtrate begins to decrease rapidly which means that fiber networks are rapidly building on the screen surface. This indicates that the surface friction has increased greater than the internal friction in the fiber plug. At this stage the pressure difference is to be decreased, as illustrated in FIG. 9a, and the volume of filtrate begins to increase, as illustrated in FIG. 9b until after a certain time the volume of filtrate in relation to the pressure difference is the same as at the beginning of the adjustment. In this way the screen surface has been completely cleaned. When the limit of the pressure difference, i.e. the value at which the fiber mat begins to form, is known, the pressure difference can be set a little smaller which guarantees an even filtrate flow and the screen surface shows no tendency to be clogged. The pressure difference in relation to its limit, i.e. to the pressure difference at which the screen is clogged, is determined by the variation of the consistency of the supplied pulp. The more homogenous the consistency of the pulp is the closer to the said limit the pressure difference can be chosen and vice versa. The procedure described above can successfully be used also when the device is clogged. The discharge outlet for the filtrate only needs to be throttled and the fiber plug pulls the fibers stuck to the screen surface with it and the screen surface is cleaned.

Finally, it has been proved advantageous to provide on the filtrate side of the screen plate an ultra sonic or other high-frequency wave transmitter with which the sticking of fiber screen surface is made more difficult. By using the vibration described above the surface friction on the screen surface is reduced which of course results in a decrease in the flow resistance both with the pulp and with the filtrate. Further, the vibration mixes to some extent the fibers in the surface of the plug and the consistency profile becomes more even i.e. the consistency does not rise as abruptly close to the screen surface as before.

The invention is not limited to the few embodiments given a detailed description of above, but its scope of protection and extent is limited only by the accompanying patent claims. The scope of the claims is not limited by the reference numerals used, which are only provided as an aid to clarity.

I claim:

1. A method of thickening fiber suspension by extracting liquid from the suspension under the influence of a pressure difference acting over filtering surfaces, comprising the steps of:
   providing a channel equipped with the filtering surfaces;
   leading the suspension to the channel so that it flows as a plug flow consisting of a multidimensional fiber network at a flow rate decelerating stage-by-stage in a flow direction; and
   controlling amounts of extracted filtrate so that internal friction of the fiber suspension remains larger than surface friction between the fiber suspension and the filtering surfaces.

2. A method of thickening fiber suspension by extracting liquid from the suspension under the influence of a pressure difference acting over filtering surface, comprising the steps of:
   providing a channel equipped with the filtering surface;
   leading suspension to the channel so that it flows as a plug flow consisting of a multi-dimensional fiber network at a flow rate decelerating evenly in a flow direction; and
   controlling amounts of extracted filtrates so that internal friction of the fiber suspension remains larger than surface friction between the fiber suspension and the filtering surfaces.

3. A method according to claim 1 or claim 2, and further comprising a step of selecting a flow rate of the fiber suspension with regard to the suspension being thickened and the flow channel so that surface friction of the suspension advancing in the channel remains smaller than internal friction of the suspension.

4. A method according to claim 1 or claim 2, wherein said channel providing step includes providing a channel with at least one flexible surface, thickening taking place in said channel.

5. A method according to claim 1 or claim 2, wherein thickening takes place at successive stages between which the consistency of the fiber suspension is homogenized.

6. A method according to claim 1 or claim 2, and further comprising the step of directing a high-frequency vibration to the screen surfaces so as to make sticking of fibers to the screen surface more difficult and reduce surface friction.

7. A method according to claim 1 or claim 2, wherein the fiber suspension has a starting consistency of 3% to 8%.

8. A method according to claim 7, wherein the starting consistency is from 6% to 8%.

9. A method of thickening fiber suspension having an initial consistency of at least 3% by extracting liquid from the suspension under the influence of a pressure difference acting over filtering surfaces, comprising the steps of:
   providing a channel equipped with the filtering surfaces;
   leading the suspension to the channel so that it flows as a plug flow consisting of a multidimensional fiber network at a flow rate decelerating evenly in a flow direction; and
   controlling amounts of extracted filtrate so that internal friction of the fiber suspension remains larger than surface friction between the fiber suspension and the filtering surfaces.

* * * * *